United States Patent [19]

Yamane et al.

[11] Patent Number: 4,458,060
[45] Date of Patent: Jul. 3, 1984

[54] CROSS-LINKED VINYL CHLORIDE POLYMER

[75] Inventors: Kazumasa Yamane, Kobe; Masahiro Kabayashi, Amagasaki, both of Japan

[73] Assignee: Kanegafuchi Kagaku Kogyo Kabushiki Kaisha, Osaka, Japan

[21] Appl. No.: 383,611

[22] Filed: Jun. 1, 1982

[30] Foreign Application Priority Data

May 29, 1981 [JP] Japan ................................ 56-82862

[51] Int. Cl.³ .................... C08F 214/06; C08F 220/20
[52] U.S. Cl. ................................. 526/292.3; 526/313
[58] Field of Search ............................. 526/313, 292.3

[56] References Cited

U.S. PATENT DOCUMENTS 3,180,851  4/1965  Goldberg et al. .................... 526/313
3,770,811  11/1973  Lee et al. ............................ 526/313
3,960,981  6/1976  Vargiu et al. ....................... 526/313

Primary Examiner—Harry Wong, Jr.
Attorney, Agent, or Firm—Armstrong, Nikaido, Marmelstein & Kubovcik

[57] ABSTRACT

A cross-linked vinyl chloride polymer comprising (a) vinyl chloride or a mixture of vinyl chloride with a monomer copolymerizable therewith and (b) a bisphenol-modified diacrylate or dimethacrylate as a cross-linking agent. The cross-linked polymer has excellent heat stability and delustering effect, and a composition containing the cross-linked polymer as a resin component or containing it as a delustering agent for a thermoplastic resin can give with good processability a molded article having a delustered surface, a good uniformity in surface roughness, a good hand touchness and an excellent heat stability.

16 Claims, No Drawings

CROSS-LINKED VINYL CHLORIDE POLYMER

BACKGROUND OF THE INVENTION

The present invention relates to a cross-linked vinyl chloride polymer having a remarkably improved heat stability, and more particularly to a cross-linked vinyl chloride polymer having an improved heat stability which is obtained by copolymerizing vinyl chloride or a monomer mixture containing mainly vinyl chloride with a bisphenol-modified diacrylate or dimethacrylate.

In recent years, vinyl chloride polymer moldings having no plastic luster, namely the so-called delustered moldings, are favored in various fields of use, and various delustering techniques have been developed. Especially, attention is riveted to the delustering technique using cross-linked vinyl chloride polymers as a delustering agent, since it has the advantages that an extreme decrease of mechanical characteristics as seen in a delustering technique using large quantities of fillers does not occur, that it is not accompanied by an increase in cost as seen in a delustering technique by means of coating of acrylic resins, and that a specific equipment as required in a delustering technique by means of embossing is not necessary.

Accordingly, it has been attempted to develop compositions containing various cross-linked vinyl chloride polymers. For instance, it is proposed to utilize a cross-linked vinyl chloride polymer prepared by using a cross-linking agent such as diallyl phthalate, diallyl maleate, polyethylene glycol diacrylate or polyethylene glycol dimethacrylate, as disclosed in Japanese Unexamined Patent Publication (Tokkyo Kokai) No. 80354/1979 and No. 5843/1981. However, the cross-linked vinyl chloride polymers have a high softening point. Therefore, the processing temperature must be made high upon molding, and the cross-linked polymers obtained by using conventional cross-linking agent rather has the disadvantage that thermal deterioration cannot be avoided.

SUMMARY OF THE INVENTION

It has now been found that a cross-linked vinyl chloride polymer having a very excellent heat stability can be prepared by using a specific bisphenol-modified diacrylate or dimethacrylate as a cross-linking agent.

In accordance with the present invention, there is provided a cross-linked vinyl chloride polymer comprising (a) vinyl chloride or a mixture of vinyl chloride and a monomer copolymerizable therewith and (b) a bisphenol-modified diacrylate or a bisphenol-modified dimethacrylate.

The cross-linked vinyl chloride polymer of the present invention has an excellent heat stability and can provide molded articles having a delustered surface, a uniformity in surface roughness and a good hand touchness.

DETAILED DESCRIPTION

The cross-linked vinyl chloride polymers of the present invention can be employed singly or in the form of a blend with thermoplastic resins. A composition containing the cross-linked polymer of the invention has an excellent heat stability and can provide moldings having a delustered surface, a uniformity in surface roughness and a good hand touchness and moreover having an excellent heat stability. The cross-linked polymers of the invention are particularly useful as delustering agents. For instance, various rigid delustered moldings such as calendered sheets, T-die extrusion films and blow-molded bottles are obtained by blending the cross-linked polymers with thermoplastic resins such as polyvinyl chloride, vinyl chloride-ethylene copolymer, vinyl chloride-propylene copolymer, vinyl chloride-vinyl acetate copolymer and copolymers of vinyl chloride and acrylic acid or its derivative, incorporating the blend, if necessary, with additives such as heat stabilizer, lubricant, antioxidant, rubber, ultraviolet absorber, processing aid, pigment and filler, and molding the obtained composition. Also, various soft delustered moldings such as automobile parts or fixtures and calendered sheets are obtained by further adding a plasticizer to the above composition and molding it.

The cross-linked vinyl chloride polymers of the present invention are prepared by copolymerizing (a) vinyl chloride or a monomer mixture containing predominantly vinyl chloride and (b) a bisphenol-modified diacrylate or a bisphenol-modified dimethacrylate. Preferably, the bisphenol-modified diacrylate or dimethacrylate (b) is employed in an amount of 0.01 to 15 parts by weight per 100 parts by weight of the component (a), because the use of the component (b) in an amount of less than 0.01 part by weight has little effect, particularly on delustering, and when the amount is more than 15 parts by weight, the mechanical properties are lowered. The obtained cross-linked polymers usually contain about 0.01 to about 21% by weight of the component (b) units.

One of the preferable bisphenol-modified diacrylate or dimethacrylate used in the present invention is a compound of the general formula (I):

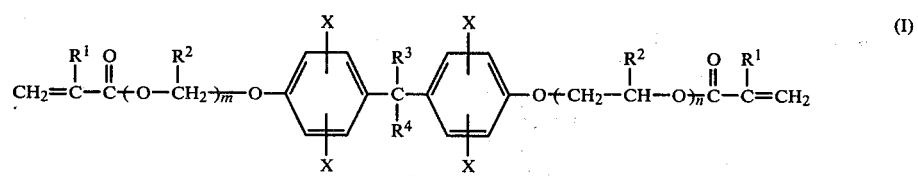

wherein $R^1$ is hydrogen atom or methyl group, $R^2$ is hydrogen atom or an alkyl group having 1 to 4 carbon atoms, $R^3$ and $R^4$ are hydrogen atom or a group selected from $-CH_3$, $-CH_2CH_3$ and $-CH_2CH_2COOH$, m and n are an integer of 1 to 10, and X is bromine atom, chlorine atom or hydrogen atom.

The compound (I) can be prepared, for instance, by conducting the addition of an alkylene glycol to the hydroxyl groups of a bisphenol and introducing acryloyl or methacryloyl group into the both ends of the addition product.

Another preferable bisphenol-modified diacrylate or dimethacrylate is a compound of the general formula (II):

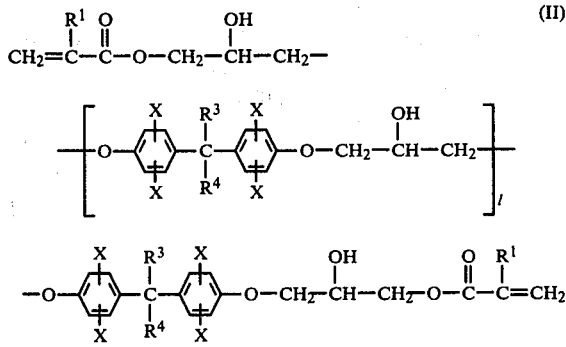

wherein $R^1$, $R^3$, $R^4$ and X are as defined above, and l is 0 or an integer of 1 to 20.

The compound (II) can be prepared, for instance, by conducting the condensation of epichlorohydrin and the hydroxyl groups of a bisphenol and reacting the epoxy groups at the both ends of the condensation product with acrylic or methacrylic acid.

As a bisphenol-modified diacrylate or dimethacrylate, there is also preferred a compound of the general formula (III):

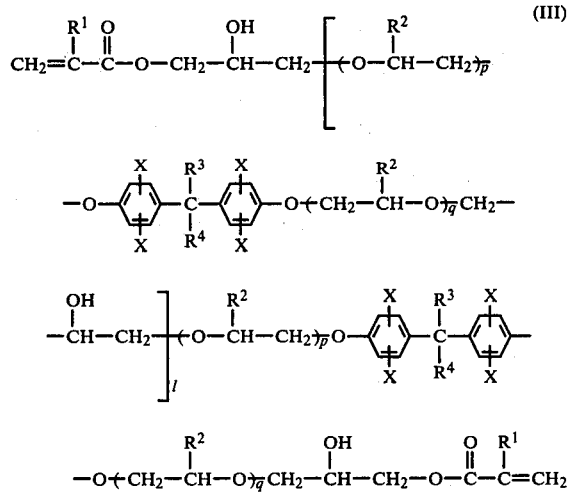

wherein $R^1$, $R^2$, $R^3$, $R^4$, l and X are as defined above, and p and q are an integer of 1 to 5.

The compound (III) can be prepared, for instance, by conducting the addition of an alkylene glycol to the hydroxyl groups of a bisphenol, followed by the condensation of epichlorohydrin and the addition product, and then reacting the epoxy groups at the both ends with acrylic or methacrylic acid.

The bisphenol-modified diacrylates and dimethacrylates may be employed alone or in admixture thereof. They also may be employed in combination with a minor amount of a conventional cross-linking agent such as diallyl phthalate, diallyl maleate, polyethylene glycol diacrylate and methacrylate, allyl acrylate, or a divinyl ether compound.

Vinyl chloride alone or a mixture of vinyl chloride and a monomer copolymerizable with vinyl chloride is employed as a monomer (a) in the present invention. Preferably, the monomer mixture contains at least 50% by weight of vinyl chloride. Examples of the copolymerizable monomer used in the invention are, for instance, a monoolefin such as ethylene or propylene, a vinyl ester such as vinyl acetate, a vinyl ether such as methyl vinyl ether, acrylic and methacrylic acids and their esters, maleic and fumaric acids and their esters and anhydrides, an aromatic vinyl compound, a vinylidene halide, and the like.

The cross-linked polymers of the present invention can be prepared by known polymerization methods, e.g. suspension polymerization, emulsion polymerization, bulk polymerization and solution polymerization. A suspension polymerization is preferred from the viewpoint of easiness and cost in preparation. Also, the polymerization manner such as adding continuously or intermittently the monomer (a) and/or the cross-linking agent (b) to the polymerization system after starting the polymerization may be suitably adopted.

In case of preparing the cross-linked polymer of the present invention by a suspension polymerization, the polymerization is usually carried out at a temperature of 20° to 80° C. During the polymerization, the temperature may be suitably changed. Known dispersing agents are employed in the suspension polymerization, e.g. organic high polymer dispersing agents such as partially hydrolyzed polyvinyl acetate, methyl cellulose, ethyl cellulose, hydroxypropoxymethyl cellulose, hydroxyethyl cellulose, polyvinyl pyrrolidone, gelatin and casein, and inorganic dispersing agents such as talc, calcium sulfate and calcium phosphate. The dispersing agents may be employed alone or in admixture thereof. The dispersing agents are employed in a conventional manner, and for instance, a manner of adding the dispersing agent to the system during the polymerization may be suitably adopted. Known radical polymerization initiators used conventionally in the polymerization of vinyl chloride are employed in the suspension polymerization, e.g. organic peroxides such as lauroyl peroxide, di-2-ethylhexyl peroxydicarbonate, diisopropyl peroxydicarbonate, isobutyryl peroxide, 3,5,5,-trimethylhexanoyl peroxide and t-butyl peroxypivalate, and azo compounds such as azobisisobutyronitrile and 2,2'-dimethylvaleronitrile. The initiators may be employed alone or in admixture thereof. The initiators are employed in a conventional manner, and for instance, the addition of the initiator to the system during the polymerization may be suitably conducted.

The cross-linked vinyl chloride polymer of the present invention has a remarkably improved heat stability as compared with a conventional cross-linked vinyl chloride polymer. Moreover, moldings obtained by employing the cross-linked polymer of the invention have an excellent delustered surface, and are uniform in surface roughness and good in hand touchness. The cross-linked polymer of the invention can be employed alone or in the form of a blend with a thermoplastic resin such as polyvinyl chloride, and the above characteristics can be obtained in both cases. In case of blending the cross-linked polymer with a thermoplastic resin, it is desirable that the ratio of the cross-linked polymer to the thermoplastic resin is from 1:99 to 50:50 by weight. Examples of the thermoplastic resin are, for instance, vinyl chloride resins, acrylonitrile-butadiene-styrene resin, methyl methacrylate-butadiene-styrene resin, acrylonitrile-butadiene rubber, ethylene-vinyl acetate resin.

The cross-linked vinyl chloride polymer or its blend with a thermoplastic resin is admixed with additives usually employed for molding processing of vinyl chloride resins, such as heat stabilizer, lubricant, processing aid and plasticizer, to provide a composition for molding. For instance, as a heat stabilizer, there are employed known heat stabilizers, e.g. tin stabilizers such as octyl tin maleate, lead stabilizers such as tribasic lead sulfate, metal soaps, Ca-Zn complex stabilizers and Ba-Zn complex stabilizers. The heat stabilizers may be employed alone or in admixture thereof. As a lubricant, there are employed known lubricants, e.g. polyethylene wax lubricants, stearic acid lubricant and alcohol type lubricant. The lubricants may be employed alone or in admixture thereof. Also, as a plasticizer, there are employed known plasticizers, e.g. phthalate plasticizers, polyester type plasticizers, phosphate plasticizers and epoxy type plasticizers. The plasticizers may be employed alone or in admixture thereof.

The present invention is more specifically described and explained by means of the following Examples, in which all % and parts are by weight unless otherwise noted.

It is to be understood that the present invention is not limited to the Examples and various changes and modifications may be made in the invention without departing from the spirit and scope thereof.

EXAMPLES 1 TO 10

A 300 liter stainless steel polymerization vessel was charged with 200 parts of demineralized water, 0.2 part of partially hydrolyzed polyvinyl acetate, 0.06 part of diisopropyl peroxide, 0.06 part of lauroyl peroxide and 1.0 part of the bisphenol-modified diacrylate or dimethacrylate shown in Table 1. After degassing, 100 parts of vinyl chloride was added to the vessel, and the polymerization was carried out at 68° C. for 15 hours. The obtained slurry was dehydrated and dried in a hot air drier at 55° C. for 24 hours to give a white powder.

COMPARATIVE EXAMPLES 1 TO 7

The procedures of the preceding Examples were repeated except that the cross-linking agents shown in Table 2 were employed instead of the bisphenol-modified diacrylate and dimethacrylate, to give a white powder.

TABLE 1

| Example No. | Cross-linking agent |
|---|---|
| Example 1 | $CH_2=CH-\underset{O}{\overset{O}{\|}}C-O-CH_2-CH_2-O-C_6H_4-C(CH_3)_2-C_6H_4-O-CH_2-CH_2-O-\underset{O}{\overset{O}{\|}}C-CH=CH_2$ |
| Example 2 | $CH_2=CH-\overset{O}{\overset{\|}{C}}(-O-CH_2-CH_2)_n-O-C_6H_4-C(CH_3)_2-C_6H_4-O-(CH_2-CH_2-O)_n-\overset{O}{\overset{\|}{C}}-CH=CH_2$ |
| Example 3 | $CH_2=C(CH_3)-\underset{O}{\overset{\|}{C}}-O-CH_2-CH_2-O-C_6HBr_2-C(CH_3)_2-C_6HBr_2-O-CH_2-CH_2-O-\underset{O}{\overset{\|}{C}}-C(CH_3)=CH_2$ |
| Example 4 | $CH_2=C(CH_3)-\underset{O}{\overset{\|}{C}}-O-CH_2-CH_2-O-C_6H_2Cl_2-C(CH_3)_2-C_6H_2Br_2-O-CH_2-CH_2-O-\underset{O}{\overset{\|}{C}}-C(CH_3)=CH_2$ |
| Example 5 | $CH_2=CH-\overset{O}{\overset{\|}{C}}-O-CH_2-CH(OH)-CH_2-O-C_6H_4-C(CH_3)_2-C_6H_4-O-CH_2-CH(OH)-CH_2-O-\overset{O}{\overset{\|}{C}}-CH=CH_2$ |
| Example 6 | $CH_2=CH-\overset{O}{\overset{\|}{C}}-O-CH_2-CH(OH)-CH_2-[O-C_6H_4-C(CH_3)_2-C_6H_4-O-CH_2-CH(OH)-CH_2-]_3-O-C_6H_4-C(CH_3)_2-C_6H_4-O-CH_2-CH(OH)-CH_2-O-\overset{O}{\overset{\|}{C}}-CH=CH_2$ |
| Example 7 | $CH_2=C(CH_3)-\underset{O}{\overset{\|}{C}}-O-CH_2-CH(OH)-CH_2-O-C_6H_4-CH_2-C_6H_4-O-CH_2-CH(OH)-CH_2-O-\underset{O}{\overset{\|}{C}}-C(CH_3)=CH_2$ |

TABLE 1-continued

| Example No. | Cross-linking agent |
|---|---|
| Example 8 | $CH_2=C(CH_3)-C(=O)-O-CH_2-CH(OH)-CH_2-O-\text{Ar}-C(CH_3)(CH_2CH_2COOH)-\text{Ar}-O-CH_2-CH(OH)-CH_2-O-C(=O)-C(CH_3)=CH_2$ |
| Example 9 | $CH_2=C(CH_3)-C(=O)-O-CH_2-CH(OH)-CH_2-O-CH_2-CH_2-O-\text{Ar}-C(CH_3)_2-\text{Ar}-O-CH_2-CH_2-O-CH_2-CH(OH)-CH_2-O-C(=O)-C(CH_3)=CH_2$ |
| Example 10 | $CH_2=CH-C(=O)-O-CH_2-CH(OH)-CH_2-[(CH_2-CH_2-O)_{\overline{n}}-\text{Ar}-C(CH_3)_2-\text{Ar}-O-(CH_2-CH_2-O)_{\overline{n}}CH_2-CH(OH)-CH_2-(O-CH_2-CH_2)_{\overline{n}}O-\text{Ar}-C(CH_3)_2-\text{Ar}-O-(CH_2-CH_2-O)_{\overline{n}}CH_2-CH(OH)-CH_2-O-C(=O)-CH=CH_2]_2$ |

TABLE 2

| Com. Ex. No. | Cross-linking agent | |
|---|---|---|
| Com. Ex. 1 | phthalic acid di(-C(=O)-O-CH_2-CH=CH_2) | (Diallyl phthalate) |
| Com. Ex. 2 | $HC(-C(=O)-O-CH_2-CH=CH_2)=HC(-C(=O)-O-CH_2-CH=CH_2)$ | (Diallyl maleate) |
| Com. Ex. 3 | $CH_2=CH-C(=O)-O-(CH_2-CH_2-O)_{\overline{4}}C(=O)-CH=CH_2$ | (Tetraethylene glycol diacrylate) |
| Com. Ex. 4 | $CH_2=CH-C(=O)-O-(CH_2-CH_2-O)_{\overline{8}}C(=O)-CH=CH_2$ | (Octaethylene glycol diacrylate) |
| Com. Ex. 5 | $CH_2=C(CH_3)-C(=O)-O-(CH_2-CH_2-O)_{\overline{4}}C(=O)-C(CH_3)=CH_2$ | (Tetraethylene glycol dimethacrylate) |
| Com. Ex. 6 | $CH_2=CH-CH_2-O-C(=O)-CH=CH_2$ | (Allyl acrylate) |
| Com. Ex. 7 | $CH_2=CH-O-C_8H_{16}-O-CH=CH_2$ | (Octane-diol divinyl ether) |

About 2 g. of the white powder obtained in Examples 1 to 10 and Comparative Examples 1 to 7 was weighed exactly, and thereto was added 200 g. of tetrahydrofuran. The insoluble portion was separated by a glass filter and was dried at 35° C. The gel fraction was calculated according to the following equation. The results are shown in Table 3.

$$\text{Gel fraction (\%)} = \frac{\text{Weight of insoluble portion}}{\text{Weight of sample}} \times 100$$

About 10 g. of the white powder obtained in Examples 1 to 10 and Comparative Examples 1 to 7 was weighed exactly, and the rate of dehydrochlorination was measured by employing an automatic titrator (automatic titrator type AT-107 made by Kyoto Denshi Kogyo Kabushiki Kaisha) to estimate the heat stability in molding processing. The measurement was conducted at an oil bath temperature of 250° C., a N₂ flow rate of 20 ml./min. and a titration rate of 0.02 ml./sec., and the time till 5.0 ml. of an aqueous solution of sodium hydroxide of a prescribed concentration was consumed, was measured. The results are shown in Table 3.

There were admixed 40 parts of the white powder obtained in Examples 1 to 10 and Comparative Examples 1 to 7, 60 parts of polyvinyl chloride, 2.5 parts of octyl tin maleate, 0.5 part of octyl tin laurate, 0.5 part of polyethylene wax, 2.0 parts of titanium dioxide, 4.5 parts of a processing aid (commercial name "Kaneace PA 20" made by Kanegafuchi Kagaku Kogyo Kabushiki Kaisha) and 20 parts of an impact improver (commercial name "Kaneace FM" made by Kanegafuchi Kagaku Kogyo Kabushiki Kaisha). The mixture was kneaded by rolls at 180° C. for 8 minutes and was formed into a sheet having a thickness of about 0.5 mm. It was found by the naked eye that the sheet had a good delustered surface. The sheet was cut into a piece having the size of 3 cm.×6 cm. to give a specimen. It was placed in a Geer's oven aging tester maintained at 200° C. The coloration was observed by the naked eye at intervals of 15 minutes, and the time till the specimen was colored, was measured to estimate the heat stability of moldings. The results are shown in Table 3.

TABLE 3

|  | Gel fraction (%) | Rate of dehydrochlorination (min.) | Time of coloration (min.) |
|---|---|---|---|
| Ex. 1 | 29 | 65 | 90 |
| Ex. 2 | 35 | 56 | 75 |
| Ex. 3 | 28 | 72 | 105 |
| Ex. 4 | 29 | 75 | 105 |
| Ex. 5 | 30 | 73 | 105 |
| Ex. 6 | 37 | 87 | 120 |
| Ex. 7 | 31 | 64 | 90 |
| Ex. 8 | 28 | 55 | 75 |
| Ex. 9 | 40 | 57 | 75 |
| Ex. 10 | 42 | 85 | 120 |
| Com. Ex. 1 | 27 | 35 | 45 |
| Com. Ex. 2 | 30 | 39 | 45 |
| Com. Ex. 3 | 26 | 30 | 30 |
| Com. Ex. 4 | 27 | 28 | 30 |
| Com. Ex. 5 | 25 | 32 | 30 |
| Com. Ex. 6 | 40 | 37 | 45 |
| Com. Ex. 7 | 24 | 48 | 60 |

From the results shown in Table 3, it is understood that the gelled portion insoluble in tetrahydrofuran is formed by employing any of the cross-linking agents and the cross-linked vinyl chloride polymers are produced. Also, it is understood that the cross-linked vinyl chloride polymers of the present invention are superior to conventional cross-linked vinyl chloride polymers in both of the heat stability of the cross-linked polymers themselves estimated by the rate of dehydrochlorination and the heat stability of moldings estimated by the Geer's oven coloration test.

In addition to the ingredients used in the Examples, other ingredients can be used in the Examples as set forth in the specification to obtain substantially the same results.

What we claim is:

1. A cross-linked vinyl chloride polymer comprising (a) a first member selected from the group consisting of vinyl chloride and a mixture of at least 50% by weight of vinyl chloride and a vinyl monomer copolymerizable therewith and (b) a second member selected from the group consisting of a compound of the general formula (I):

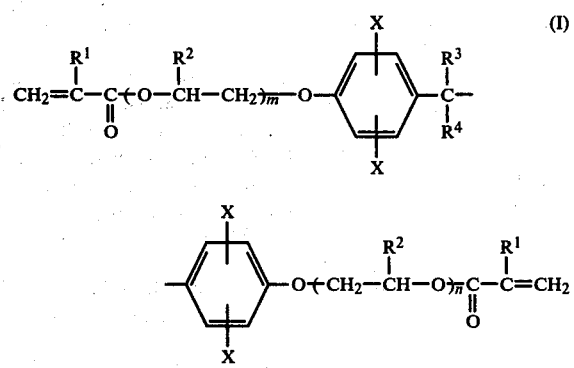

wherein $R^1$ is hydrogen or methyl; $R^2$ is hydrogen or an alkyl group having 1 to 4 carbon atoms; $R^3$ and $R^4$ are independently selected from the group consisting of hydrogen, $-CH_3$, $-CH_2CH_3$ and $-CH_2CH_2COOH$; m and n are integers each having a value of 1 to 10; and X is bromine, chlorine or hydrogen, a compound of the general formula (II):

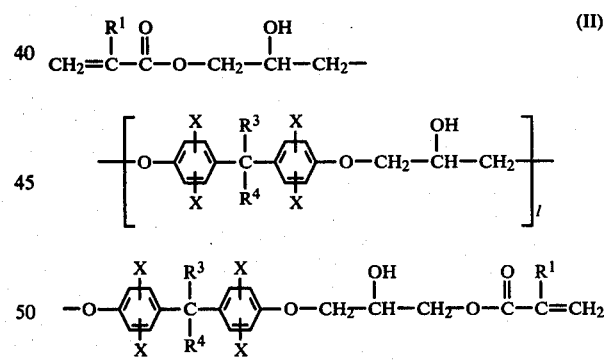

wherein $R^1$, $R^3$, $R^4$ and X are as defined above, and l is 0 or an integer having a value of 1 to 20, and a compound of the general formula (III):

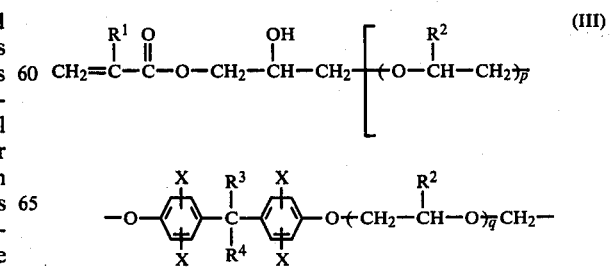

-continued

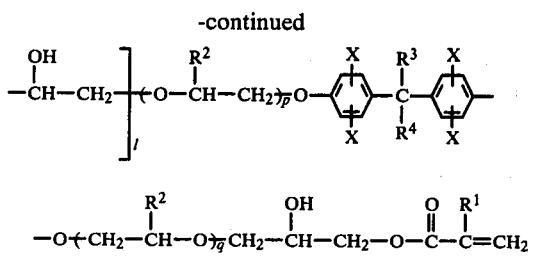

$$-O+CH_2-\underset{R^2}{\overset{|}{CH}}-O\overset{}{\underset{q}{\rightarrow}}CH_2-\underset{OH}{\overset{|}{CH}}-CH_2-O-\underset{}{\overset{O}{\overset{\|}{C}}}-\underset{R^1}{\overset{|}{C}}=CH_2$$

wherein $R^1$, $R^2$, $R^3$, $R^4$, X and l are as defined above, and p and q are integers each having a value of 1 to 5; the amount of component (a) being 0.01 to 21 percent by weight of the total amount of components (a) and (b).

2. The cross-linked polymer of claim 1 wherein the copolymerizable vinyl monomer is a member selected from the group consisting of a monoolefin, vinyl ester, vinyl ether, acrylic acid and esters thereof, methacrylic acid and esters thereof, maleic acid, fumaric acid, an aromatic vinyl compound, and vinylidene halide.

3. The cross-linked polymer of claim 1, wherein said first member is vinyl chloride.

4. The cross-linked polymer of claim 3, wherein said second member is a compound of the general formula (I).

5. The cross-linked polymer of claim 4, wherein $R^1$, $R^2$, and X are hydrogen, $R^3$ and $R^4$ are methyl, m is two and n is two.

6. The cross-linked polymer of claim 4, wherein $R^1$, $R^2$ and X are hydrogen, $R^3$ and $R^4$ are methyl, m is two and n is two.

7. The cross-linked polymer of claim 4 wherein $R^1$, $R^3$ and $R^4$ are methyl, $R^2$ is hydrogen, X is bromine, m is one and n is one.

8. The cross-linked polymer of claim 4, wherein $R^1$, $R^3$ and $R^4$ are methyl, $R^2$ is hydrogen, X is chlorine, m is one and n is one.

9. The cross-linked polymer of claim 3, wherein said second member is a compound of the general formula (II).

10. The cross-linked polymer of claim 9, wherein $R^1$ and X are hydrogen, $R^3$ and $R^4$ are methyl and l is zero.

11. The cross-linked polymer of claim 9, wherein $R^1$ and X are hydrogen, $R^3$ and $R^4$ are methyl and l is three.

12. The cross-linked polymer of claim 9, wherein $R^1$ is methyl, $R^3$ and $R^4$ are hydrogen and l is zero.

13. The cross-linked polymer of claim 9, wherein $R^1$ and $R^3$ are methyl, $R^4$ is $-CH_2CH_2COOH$ and l is zero.

14. The cross-linked polymer of claim 3, wherein said second member is a compound of the general formula (III).

15. The cross-linked polymer of claim 14, wherein $R^1$, $R^3$ and $R^4$ are methyl, $R^2$ and X are hydrogen, l is zero, p is one and q is one.

16. The cross-linked polymer of claim 14, wherein $R^1$, $R^2$ and X are hydrogen, $R^3$ and $R^4$ are methyl, l is two, p is two and q is two.

* * * * *